United States Patent
Swamy et al.

(10) Patent No.: US 11,520,784 B2
(45) Date of Patent: Dec. 6, 2022

(54) UTILIZING NEURAL NETWORK AND MACHINE LEARNING MODELS TO GENERATE A QUERY AFTER MIGRATING DATA FROM A SOURCE DATA STRUCTURE TO A TARGET DATA STRUCTURE

(71) Applicant: Accenture Global Solutions Limited, Dublin (IE)

(72) Inventors: Jayant Swamy, Bangalore (IN); Aniruddha Ray, Bangalore (IN); Namratha Maheshwary, Bangalore (IN); Sandeep Kumar Singh, Bengaluru (IN); Tanmay Mondal, Kolkata (IN)

(73) Assignee: Accenture Global Solutions Limited, Dublin (IE)

( * ) Notice: Subject to any disclaimer, the term of this patent is extended or adjusted under 35 U.S.C. 154(b) by 357 days.

(21) Appl. No.: 16/664,143

(22) Filed: Oct. 25, 2019

(65) Prior Publication Data
US 2021/0124738 A1   Apr. 29, 2021

(51) Int. Cl.
*G06F 16/2453*   (2019.01)
*G06F 16/21*   (2019.01)
*G06F 40/20*   (2020.01)
*G06K 9/62*   (2022.01)
*G06N 3/02*   (2006.01)
*G06N 20/00*   (2019.01)

(52) U.S. Cl.
CPC ........ *G06F 16/2453* (2019.01); *G06F 16/211* (2019.01); *G06F 16/214* (2019.01); *G06F 40/20* (2020.01); *G06K 9/6267* (2013.01); *G06N 3/02* (2013.01); *G06N 20/00* (2019.01)

(58) Field of Classification Search
CPC ........ G06N 20/00; G06N 3/02; G06N 20/002; G06F 16/211; G06F 16/214; G06F 40/20; G06F 16/2453; G06K 9/6267
USPC ........................................................ 707/713
See application file for complete search history.

(56) References Cited

U.S. PATENT DOCUMENTS 9,280,535 B2   3/2016   Varma et al.
10,223,417 B1   3/2019   Sirin et al.
(Continued)

OTHER PUBLICATIONS

Marcus et al.: "Neo: A Learned Query Optimizer", arXiv:1904.03711v1 [cs.DB] Apr. 7, 2019 (Year: 2019).*

*Primary Examiner* — Kuen S Lu
(74) *Attorney, Agent, or Firm* — Harrity & Harrity, LLP

(57) ABSTRACT

A device may receive source code from a source data structure, and may receive information associated with a target data structure. The device may analyze the source code to extract statements, and may utilize natural language processing on the statements to identify functions and keywords associated with the source data structure. The device may train a machine learning model with the functions and the keywords to generate a trained machine learning model, and may process the information associated with the target data structure, with the trained machine learning model, to transform a source query to a target query compatible with the target data structure. The device may process the target query, with a neural network model, to generate an optimized target query, and may cause data from the source data structure to be migrated to the target data structure based on the optimized target query.

20 Claims, 14 Drawing Sheets

(56) References Cited

U.S. PATENT DOCUMENTS

| | | | | |
|---|---|---|---|---|
| 2017/0344433 A1* | 11/2017 | Bae | ................... | G06F 11/1456 |
| 2017/0364694 A1 | 12/2017 | Jacob et al. | | |
| 2019/0339688 A1* | 11/2019 | Cella | ................ | G05B 19/41865 |
| 2019/0384863 A1* | 12/2019 | Sirin | ....................... | G06N 5/022 |
| 2020/0012745 A1* | 1/2020 | Bain | .................... | H04L 9/3247 |
| 2020/0218723 A1* | 7/2020 | Jacob | ................... | G06F 16/213 |
| 2021/0200762 A1* | 7/2021 | Trummer | .......... | G06F 16/24578 |

\* cited by examiner

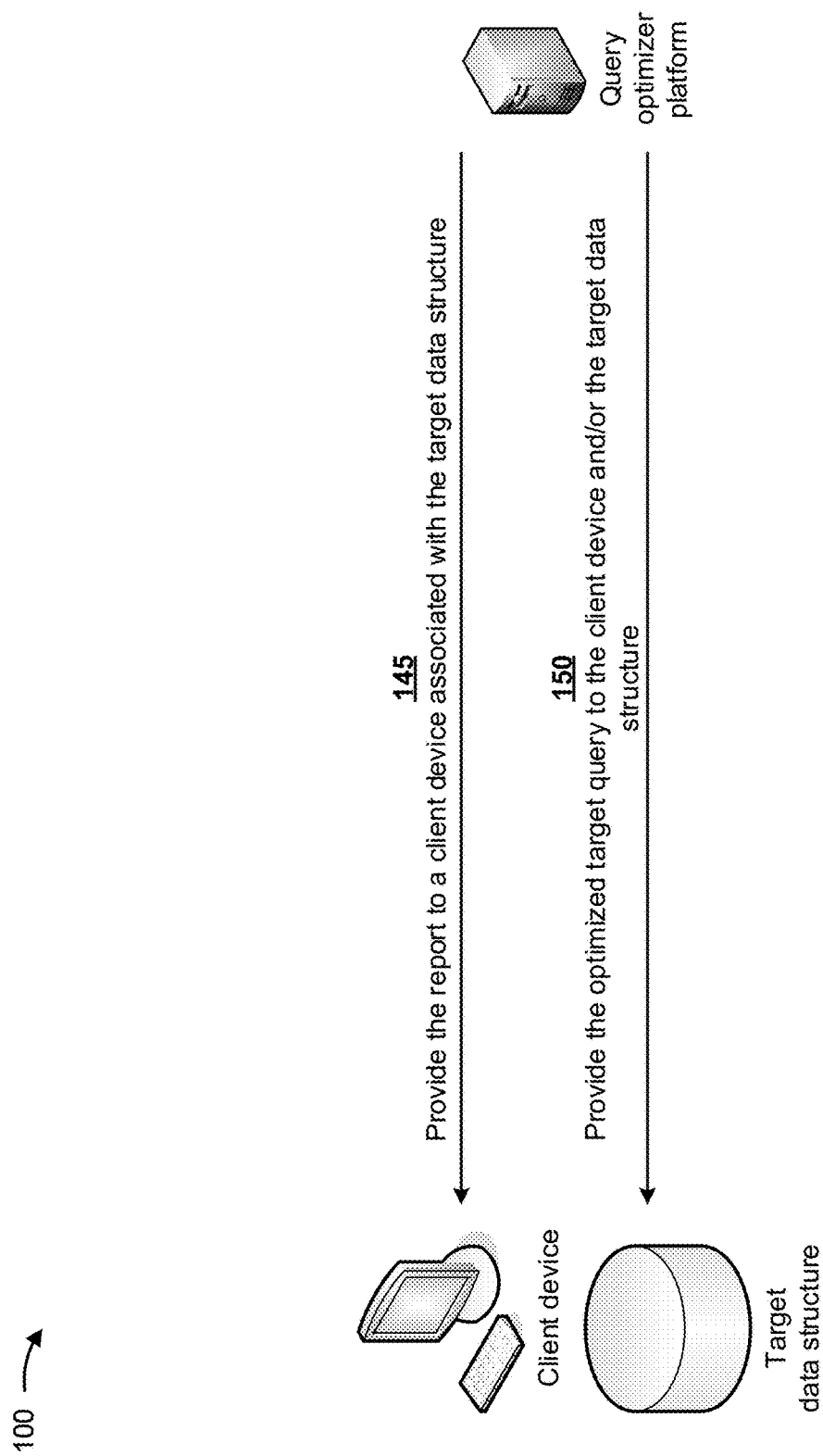

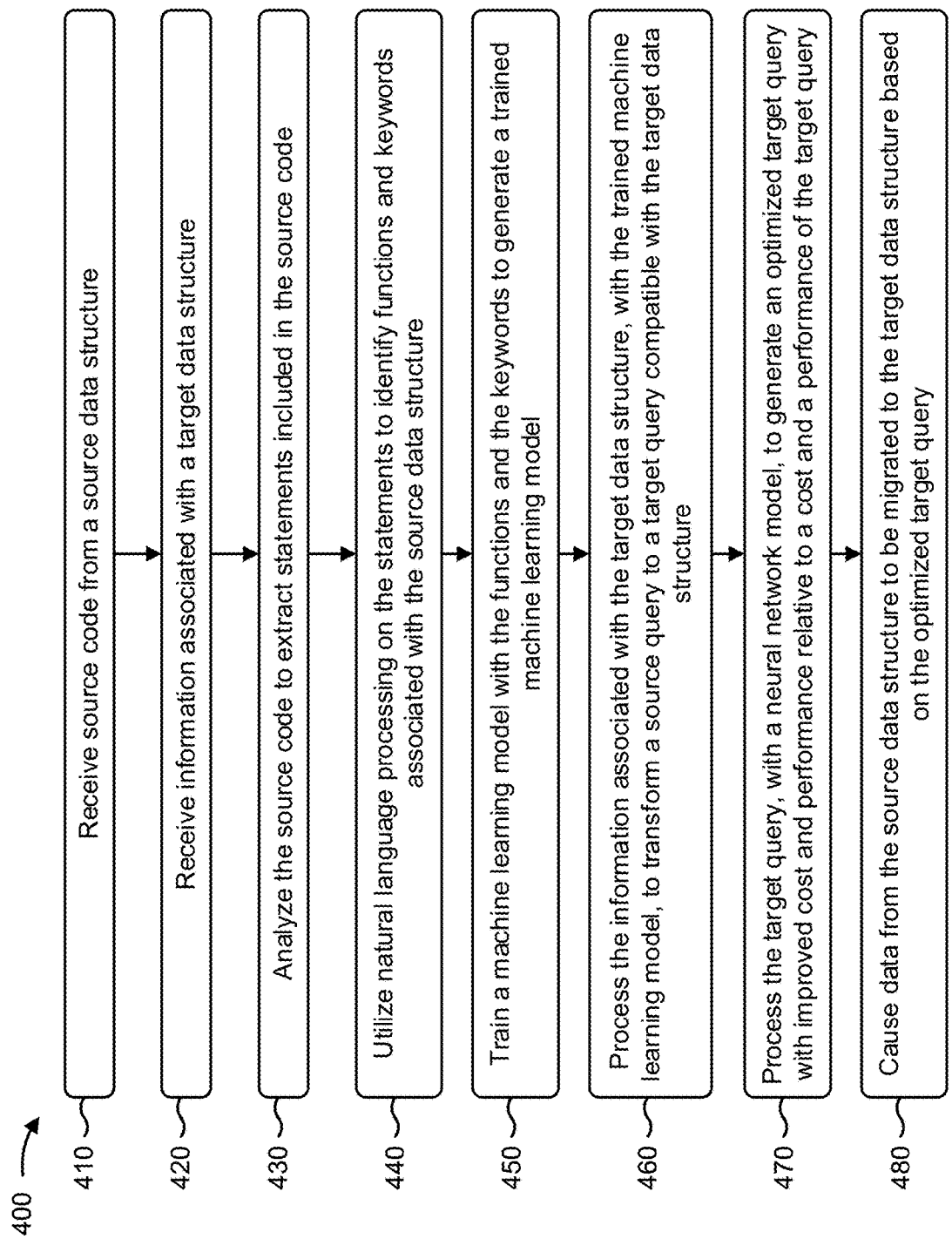

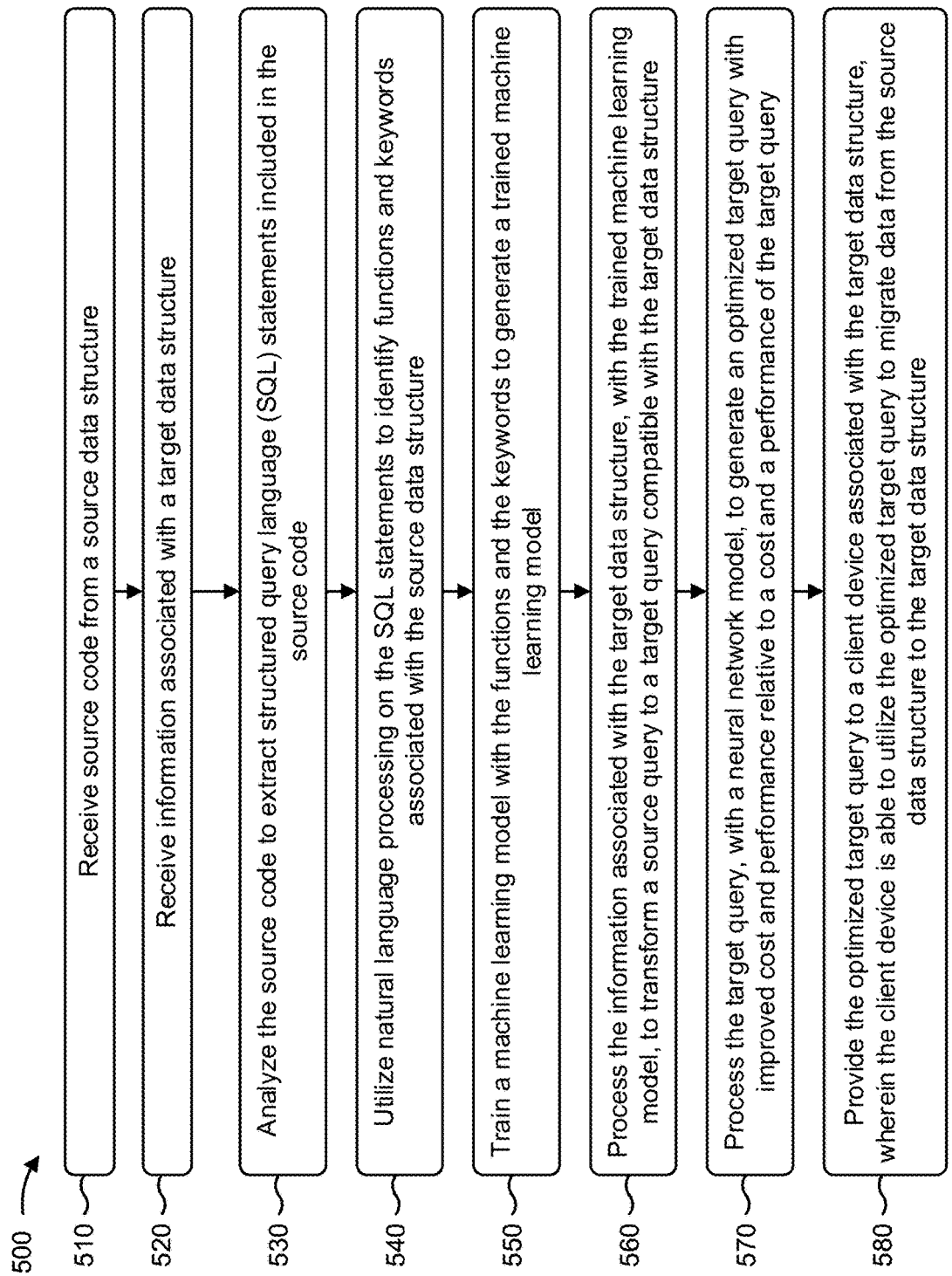

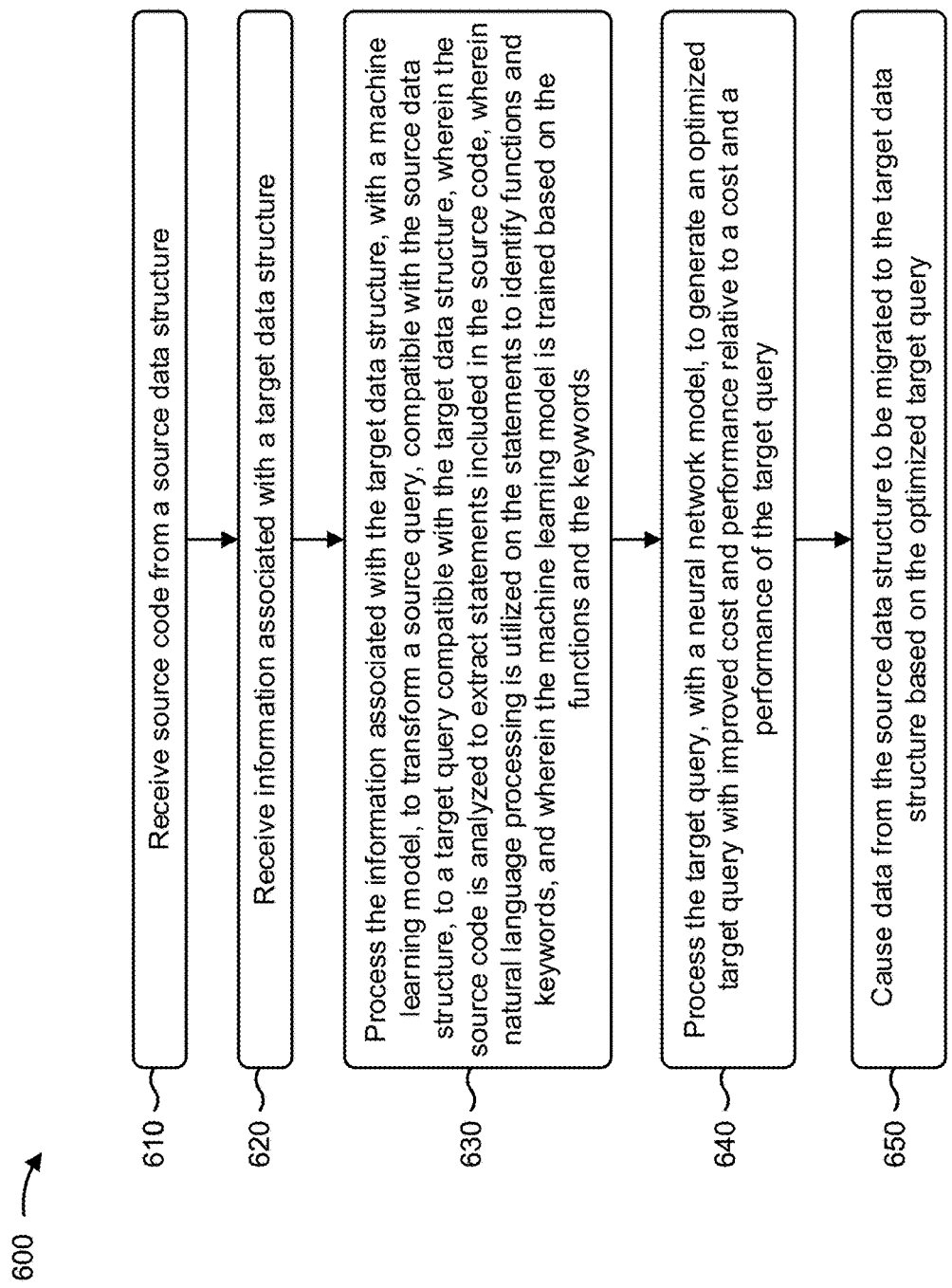

UTILIZING NEURAL NETWORK AND MACHINE LEARNING MODELS TO GENERATE A QUERY AFTER MIGRATING DATA FROM A SOURCE DATA STRUCTURE TO A TARGET DATA STRUCTURE

BACKGROUND

Currently, enterprises are migrating data from data structures associated with hardware (e.g., source data structures) to data structures associated with cloud computing environments (e.g., target data structures). This enables modernization of the source data structures and enables quicker and cheaper retrieval of data stored in the source data structures. Various techniques have been used to migrate data from the source data structures to the target data structures.

SUMMARY

According to some implementations, a method may include receiving source code from a source data structure, and receiving information associated with a target data structure. The method may include analyzing the source code to extract statements included in the source code, and utilizing natural language processing on the statements to identify functions and keywords associated with the source data structure. The method may include training a machine learning model with the functions and the keywords to generate a trained machine learning model, and processing the information associated with the target data structure, with the trained machine learning model, to transform a source query to a target query compatible with the target data structure. The method may include processing the target query, with a neural network model, to generate an optimized target query with improved cost and performance relative to a cost and a performance of the target query, and causing data from the source data structure to be migrated to the target data structure based on the optimized target query.

According to some implementations, a device may include one or more memories, and one or more processors configured to receive source code from a source data structure, and receive information associated with a target data structure. The one or more processors may analyze the source code to extract structured query language (SQL) statements included in the source code, and may utilize natural language processing on the SQL statements to identify functions and keywords associated with the source data structure. The one or more processors may train a machine learning model with the functions and the keywords to generate a trained machine learning model, and may process the information associated with the target data structure, with the trained machine learning model, to transform a source query to a target query compatible with the target data structure. The one or more processors may process the target query, with a neural network model, to generate an optimized target query with improved cost and performance relative to a cost and a performance of the target query, and may provide the optimized target query to a client device associated with the target data structure, wherein the client device may utilize the optimized target query to migrate data from the source data structure to the target data structure.

According to some implementations, a non-transitory computer-readable medium may store one or more instructions that, when executed by one or more processors of a device, may cause the one or more processors to receive source code from a source data structure, and receive information associated with a target data structure. The one or more instructions may cause the one or more processors to process the information associated with the target data structure, with a machine learning model, to transform a source query, compatible with the source data structure, to a target query compatible with the target data structure. The source code may be analyzed to extract statements included in the source code, natural language processing may be utilized on the statements to identify functions and keywords, and the machine learning model may be trained based on the functions and the keywords. The one or more instructions may cause the one or more processors to process the target query, with a neural network model, to generate an optimized target query with improved cost and performance relative to a cost and a performance of the target query, and cause data from the source data structure to be migrated to the target data structure based on the optimized target query.

BRIEF DESCRIPTION OF THE DRAWINGS

FIGS. 1A-1I are diagrams of one or more example implementations described herein.

FIGS. 4-6 are flow charts of example processes for utilizing neural network and machine learning models to generate a query after migrating data from a source data structure to a target data structure.

DETAILED DESCRIPTION

Figure 1A:
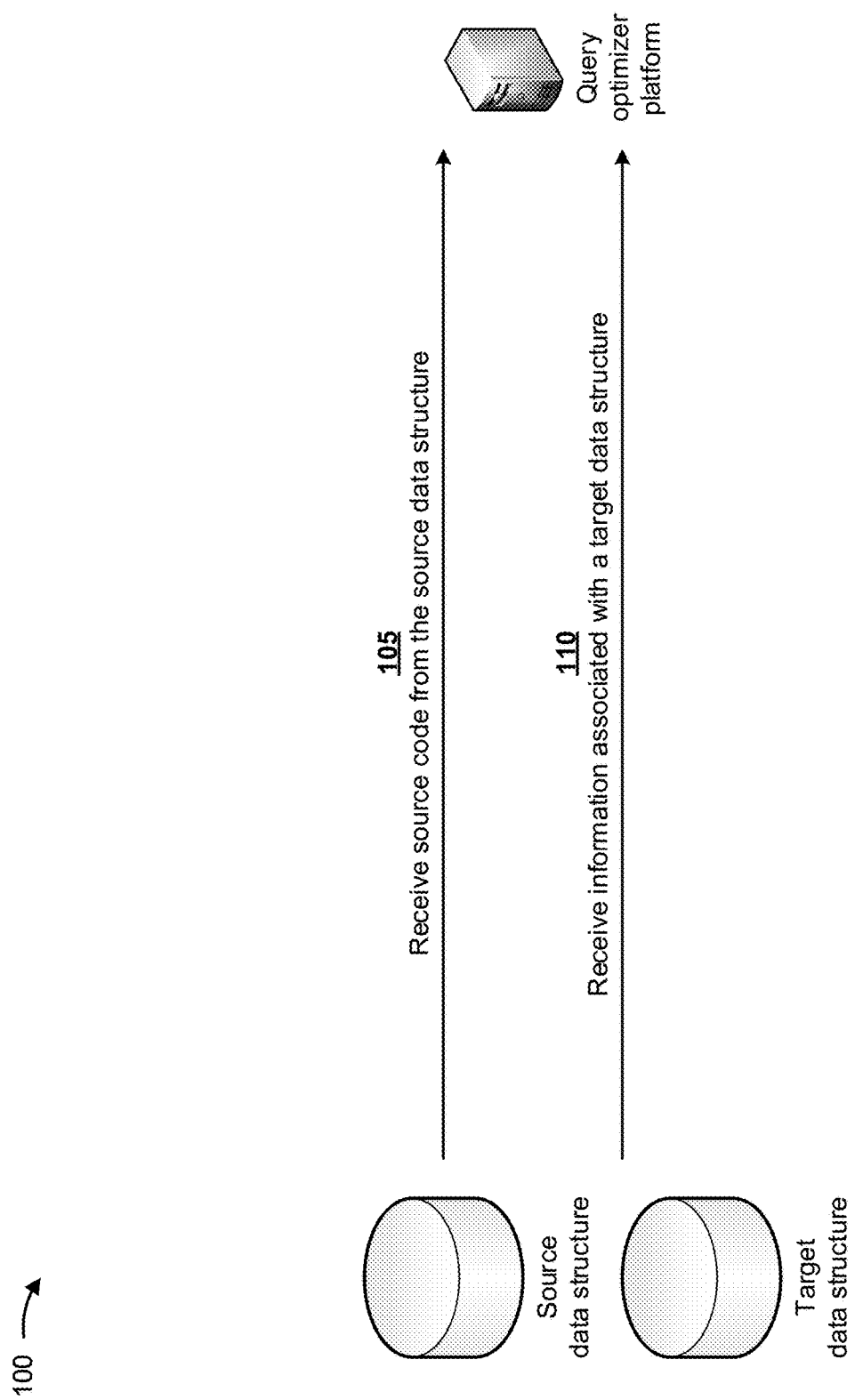

The following detailed description of example implementations refers to the accompanying drawings. The same reference numbers in different drawings may identify the same or similar elements.

Current techniques for migrating data from a source data structure to a target data structure are tedious and dependent on manual intervention. For example, a skilled user (e.g., a database manager) manually maps the source data structure and the target data structure so that other skilled users may manually transform and migrate data from the source data structure to the target data structure. Furthermore, manually mapping the source data structure and the target data structure may be delayed when there is no suitable mapping between the source data structure and the target data structure. Thus, current techniques waste computing resources (e.g., processing resources, memory resources, communication resources, and/or the like), networking resources, and/or the like associated with incorrectly migrating data from the source data structure to the target data structure based on incorrect mappings, identifying the incorrect mappings, correcting the incorrect mappings, reperforming the migration of the data from the source data structure to the target data structure, and/or like.

Some implementations described herein provide a query optimizer platform that utilizes neural network and machine learning models to generate a query after migrating data from a source data structure to a target data structure. For example, the query optimizer platform may receive source code from a source data structure, and may receive information associated with a target data structure. The query optimizer platform may analyze the source code to extract statements included in the source code, and may utilize natural language processing on the statements to identify functions and keywords associated with the source data structure. The query optimizer platform may train a machine learning model with the functions and the keywords to generate a trained machine learning model, and may process the information associated with the target data structure, with the trained machine learning model, to transform a source query, compatible with the source data structure, to a target query compatible with the target data structure. The query optimizer platform may process the target query, with a neural network model, to generate an optimized target query with improved cost and performance relative to a cost and a performance of the target query, and may cause data from the source data structure to be migrated to the target data structure based on the optimized target query.

In this way, the query optimizer platform generates a query after migrating data from a source data structure to a target data structure based on neural network and machine learning models. This, in turn, conserves computing resources (e.g., processing resources, memory resources, communication resources, and/or the like), networking resources, and/or the like that would otherwise be wasted incorrectly migrating data from the source data structure to the target data structure based on incorrect mappings, identifying the incorrect mappings, correcting the incorrect mappings, reperforming the migration of the data from the source data structure to the target data structure, and/or like. Furthermore, the query optimizer platform optimizes the query for migrating data from the source data structure to the target data structure in order to reduce costs and improve performance associated with the migration, which further conserves computing resources, networking resources, and/or the like.

FIGS. 1A-1I are diagrams of one or more example implementations 100 described herein. As shown in FIG. 1A, a source data structure and a target data structure may be associated with a query optimizer platform. The source data structure may include a data structure (e.g., a data warehouse, a database engine, a data repository, a data center, a cloud computing resource, and/or the like) from which data is to be migrated. The target data structure may include a data structure (e.g., a data warehouse, a database engine, a data repository, a data center, a cloud computing resource, and/or the like) to which the data from the source data structure is to be migrated. The query optimizer platform may utilize neural network and machine learning models to generate a query for migrating data from the source data structure to the target data structure.

As further shown in FIG. 1A, and by reference number 105, the query optimizer platform may receive source code from the source data structure. In some implementations, the source code may be associated with one or more different programming languages, frameworks, platforms, and/or the like. For example, the source code may include Java code, Python code, .Net code, and/or the like. The query optimizer platform may periodically receive the source code, may continuously receive the source code, may receive the source code based on a request or a command, and/or the like. The query optimizer platform may store the source code in a data structure (e.g., a database, a table, a list, and/or the like) associated with the query optimizer platform.

As further shown in FIG. 1A, and by reference number 110, the query optimizer platform may receive information associated with the target data structure. The information associated with the target data structure may include information identifying how the target data structure is arranged (e.g., a database structure of the target data structure, a format of data stored in the target data structure, syntax utilized in the target data structure, source code utilized in the target data structure, query language utilized to extract information from the target data structure, and/or the like). The query optimizer platform may periodically receive the information associated with the target data structure, may continuously receive the information associated with the target data structure, may receive the information associated with the target data structure based on a request or a command, and/or the like. The query optimizer platform may store the information associated with the target data structure in the data structure associated with the query optimizer platform.

Figure 1B:
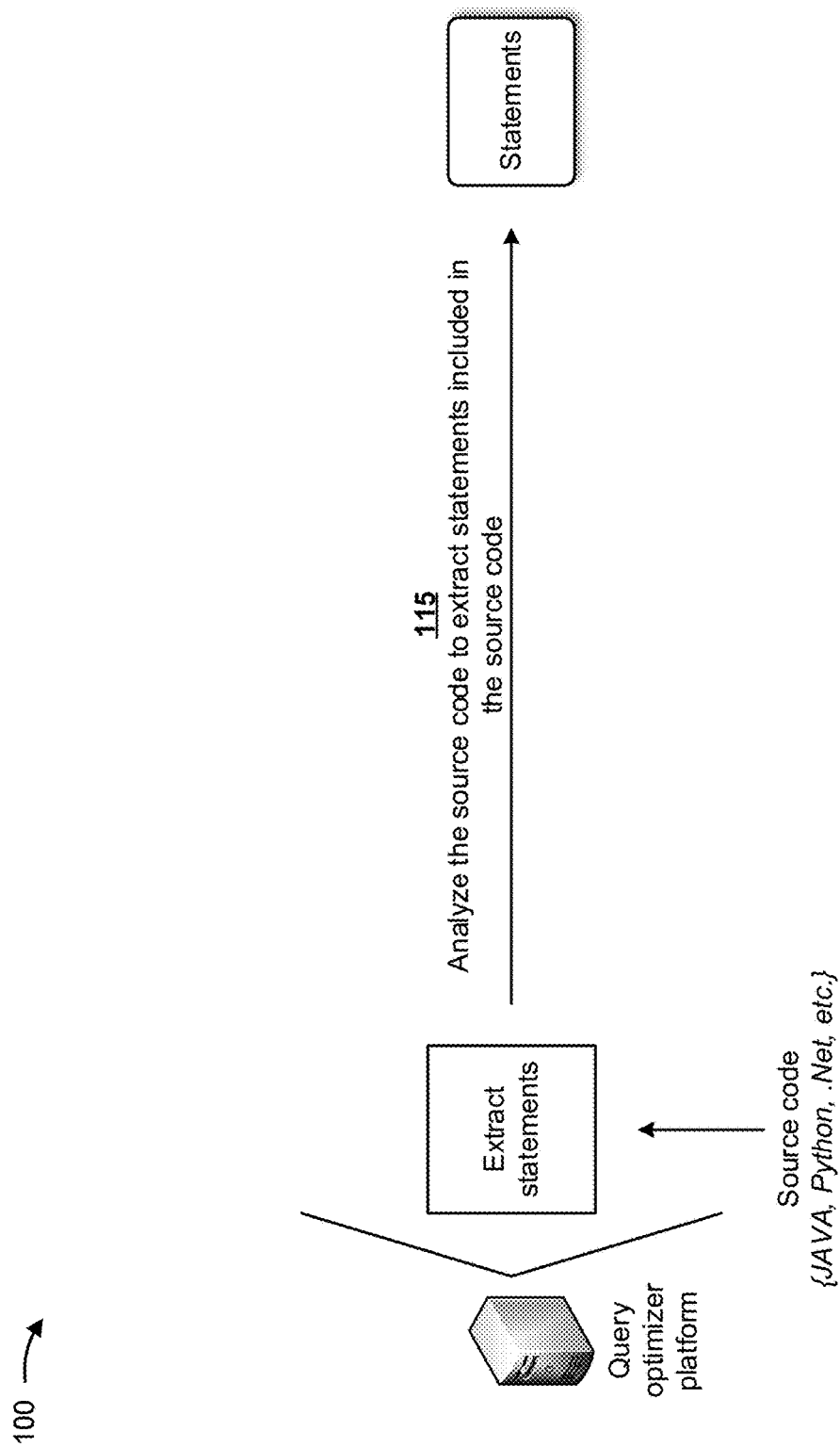

As shown in FIG. 1B, and by reference number 115, the query optimizer platform may analyze the source code to extract statements included in the source code. In some implementations, the query optimizer platform may scan the source code (e.g., Java code, Python code, .Net code, and/or the like) and extract statements, such as structured query language (SQL) statements, from the source code. SQL is a programming language designed to manage data stored in databases (e.g., relational databases), and operates through simple, declarative statements that keep data accurate and secure and help maintain the integrity of the databases, regardless of size. In some implementations, the query optimizer platform may compile a list of the extracted statements (e.g., class names, method names, and/or the like), may generate one or more reports for tracking use of the extracted statements, and/or the like.

Figure 1C:
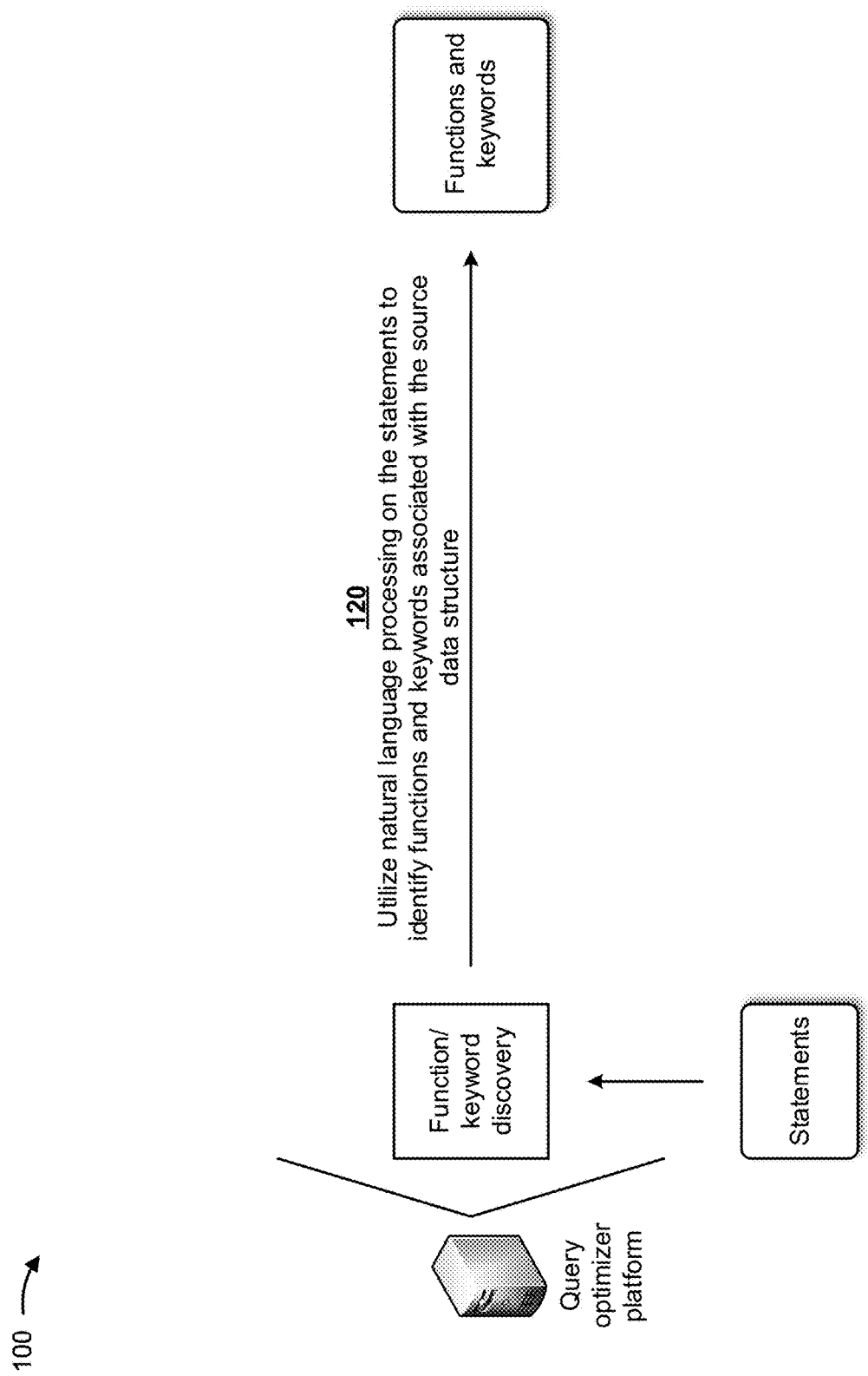

As shown in FIG. 1C, and by reference number 120, the query optimizer platform may utilize natural language processing on the statements to identify functions and keywords associated with the source data structure. For example, the query optimizer platform may utilize natural language processing to parse the functions and the keywords into source tokens, and may classify each of the source tokens into a segment associated with the target data structure. If the statements are SQL statements, the query optimizer platform may compare a set of all SQL functions and keywords with the statements, and may identify the functions and the keywords associated with the source data structure based on the comparison. In some implementations, the query optimizer platform may utilize a classifier to categorize the functions and the keywords. The query optimizer platform may segment the SQL statements, may discard common tokens (e.g., field names, function arguments, and/or the like), and may identify SQL functions or keywords stemmed to root language. The query optimizer platform may utilize the segmented SQL statements to classify different functions and/or keywords. In some implementations, the query optimizer platform may classify the functions and the keywords into hierarchies of categories.

Figure 1D:
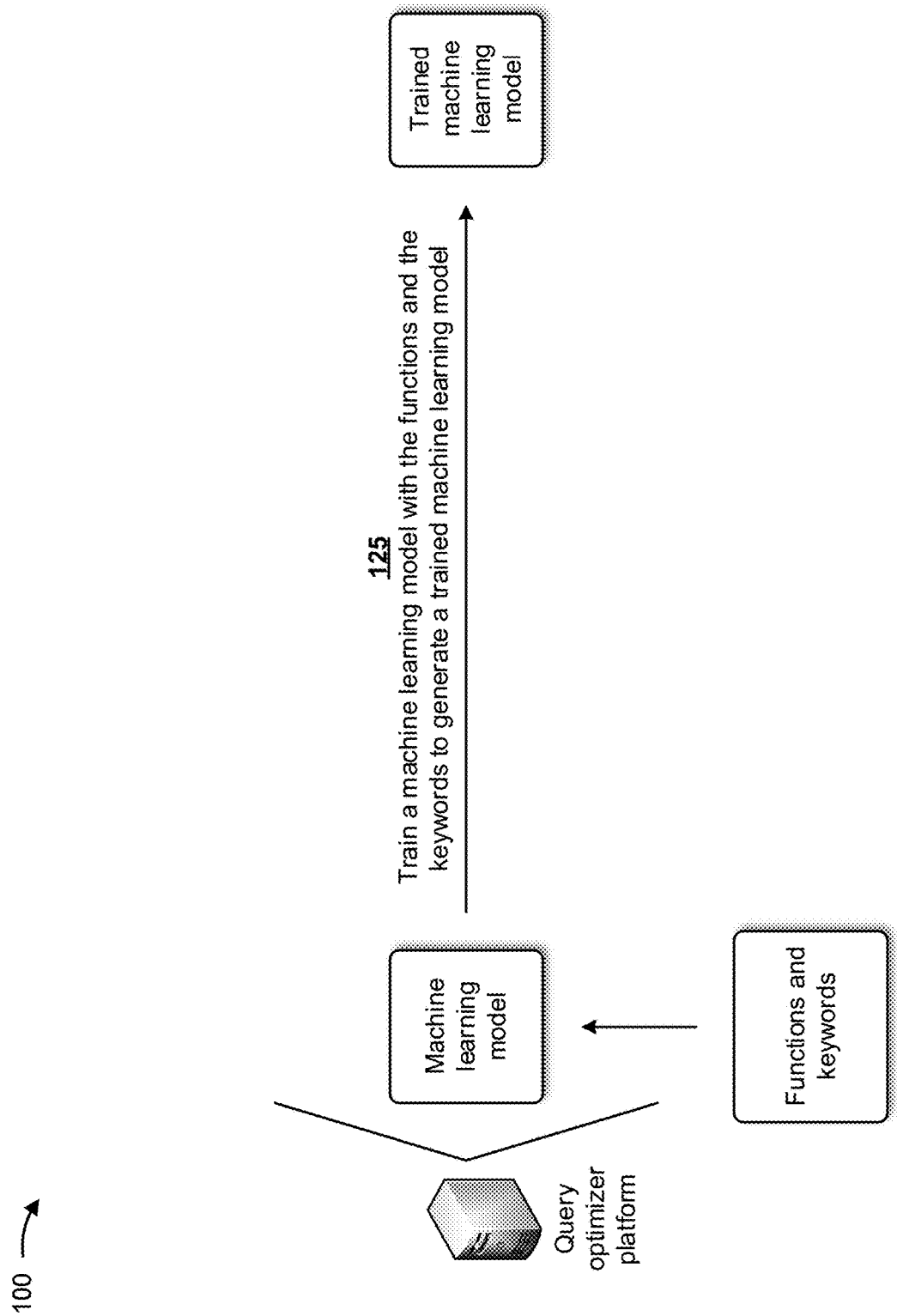

As shown in FIG. 1D, and by reference number 125, the query optimizer platform may train a machine learning model with the functions and the keywords to generate a trained machine learning model. For example, the query optimizer platform may train the machine learning model to transform a source query, compatible with the source data structure, to a target query compatible with the target data structure. In some implementations, the query optimizer platform may separate the functions and the keywords into a training set, a validation set, a test set, and/or the like. The training set may be utilized to train the machine learning model. The validation set may be utilized to validate results of the trained machine learning model. The test set may be utilized to test operation of the trained machine learning model.

In some implementations, the query optimizer platform may train the machine learning model using, for example, an unsupervised training procedure and based on the functions and the keywords. For example, the query optimizer platform may perform dimensionality reduction to reduce the functions and the keywords to a minimum feature set, thereby reducing resources (e.g., processing resources, memory resources, and/or the like) to train the machine learning model, and may apply a classification technique to the minimum feature set.

In some implementations, the query optimizer platform may use a logistic regression classification technique to determine a categorical outcome (e.g., a target query compatible with the target data structure). Additionally, or alternatively, the query optimizer platform may use a naïve Bayesian classifier technique. In this case, the query optimizer platform may perform binary recursive partitioning to split the functions and the keywords into partitions and/or branches, and use the partitions and/or branches to determine outcomes (e.g., target queries compatible with the target data structure). Based on using recursive partitioning, the query optimizer platform may reduce utilization of computing resources relative to manual, linear sorting and analysis of data points, thereby enabling use of thousands, millions, or billions of data points to train the machine learning model, which may result in more accurate models than using fewer data points.

Additionally, or alternatively, the query optimizer platform may use a support vector machine (SVM) classifier technique to generate a non-linear boundary between data points in the training set. In this case, the non-linear boundary is used to classify test data into a particular class.

Additionally, or alternatively, the query optimizer platform may train the machine learning model using a supervised training procedure that includes receiving input to the machine learning model from a subject matter expert, which may reduce an amount of time, an amount of processing resources, and/or the like to train the machine learning model relative to an unsupervised training procedure. In some implementations, the query optimizer platform may use one or more other model training techniques, such as a latent semantic indexing technique, and/or the like. For example, the query optimizer platform may perform an artificial neural network processing technique (e.g., using a two-layer feedforward neural network architecture, a three-layer feedforward neural network architecture, and/or the like) to perform pattern recognition with regard to patterns of the functions and the keywords. In this case, using the artificial neural network processing technique may improve an accuracy of the trained machine learning model (e.g., the trained machine learning model) generated by the query optimizer platform by making the model more robust to noisy, imprecise, or incomplete data, and by enabling the query optimizer platform to detect patterns and/or trends undetectable to human analysts or systems using less complex techniques.

In some implementations, rather than training the machine learning model, the query optimizer platform may obtain the trained machine learning model from another system or device that trained the machine learning model to generate the trained machine learning model. In this case, the query optimizer platform may provide the other system or device with the functions and the keywords for use in training the machine learning model, and may provide the other system or device with updated functions and keywords to retrain the machine learning model in order to update the trained machine learning model.

Figure 1E:
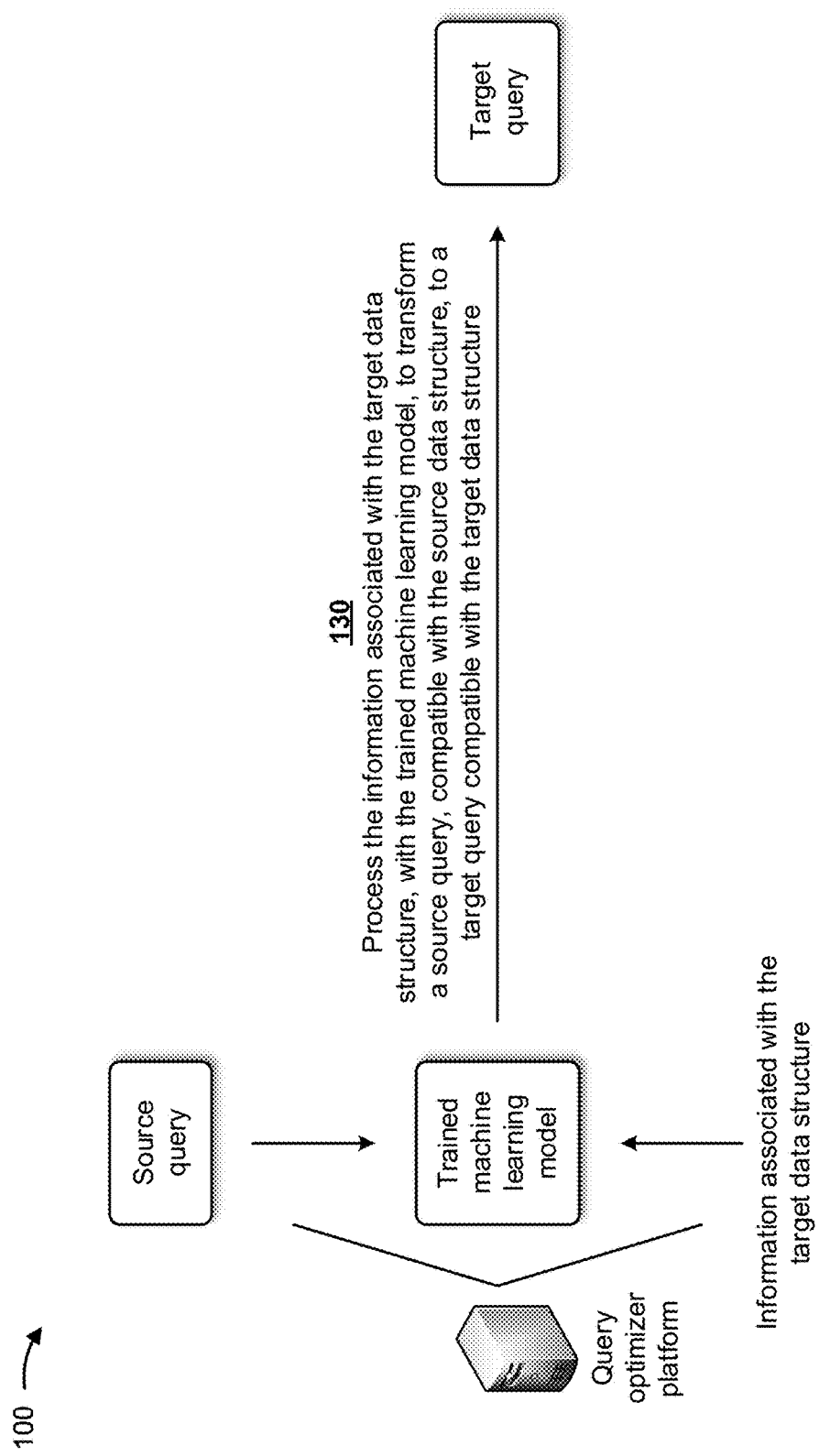

As shown in FIG. 1E, and by reference number 130, the query optimizer platform may process the information associated with the target data structure, with the trained machine learning model, to transform a source query, compatible with the source data structure, to a target query compatible with the target data structure. For example, if the source query includes multiple functions and multiple keywords, the query optimizer platform may utilize the trained machine learning model to identify the multiple functions and the multiple keywords of the source query, map each of multiple functions to a best possible function (e.g., most functionally similar) associated with the target data structure, and map each of the multiple keywords to a best possible keyword (e.g., most similar) associated with the target data structure. In some implementations, if the trained machine learning model is unable to determine a sufficiently similar function or keyword associated with the target data structure, the query optimizer platform may flag the function or keyword as a failed transformation and may provide a notification of the flagged function or keyword to an operator of the query optimizer platform. In some implementations, the trained machine learning model may convert SQL-based functions and/or keywords to a standard (e.g., an American National Standards Institute (ANSI) standard) compatible with the target data structure. In general, the trained machine learning model may convert a function of a first type to a function of a second type.

Figure 1F:
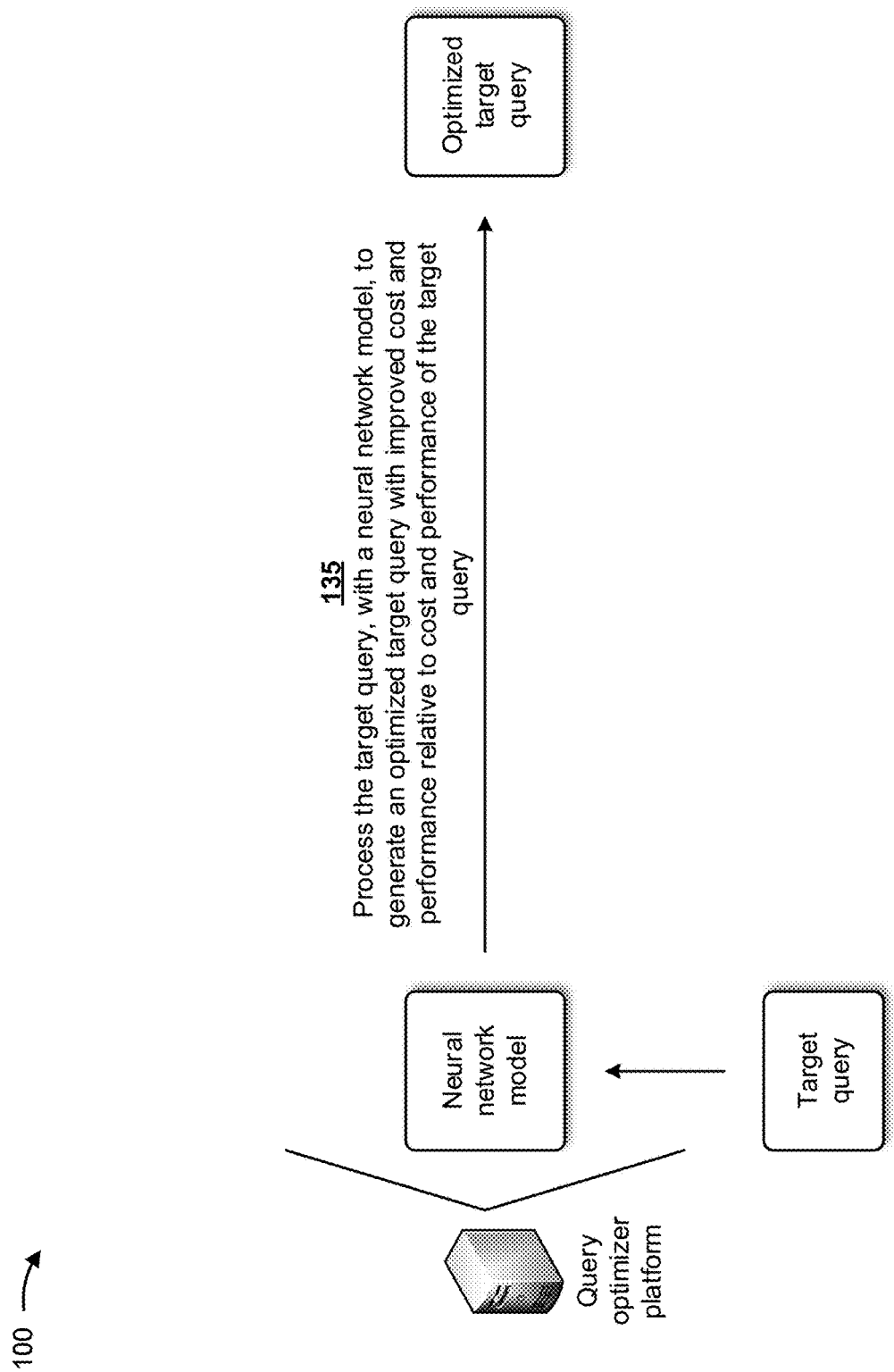

As shown in FIG. 1F, and by reference number 135, the query optimizer platform may process the target query, with a neural network model, to generate an optimized target query with improved cost and performance relative to cost and performance of the target query. For example, the neural network model may modify (e.g., improve) the target query by considering factors such as cost estimation, joining orders, nested SQL statements, and/or the like, which can impact performance of the target query depending on an environment in which the target query is executed (e.g., a database engine, execution methods, and/or the like). In some implementations, the query optimizer platform may generate a parsed representation of the target query, and may provide the parsed representation of the target query as input to the neural network model. The neural network model may generate different forms of the target query based on the parsed representation of the target query, and may select the optimized target query from the different forms of the target query, as described below.

In some implementations, the neural network model may include a reinforcement learning model (e.g., a model that is trained based on a system of reward and/or punishment to find a best possible behavior or path). In some implementations, the neural network model may include a cost-based model and/or a time-based model. For example, the query optimizer platform may utilize the neural network model to determine time periods associated with executions of the different forms of the target query, and may utilize the neural network model to determine costs associated with the executions of the different forms of the target query. The query optimizer platform may select, based on the time periods and/or the costs, a particular form of the target query, from the different forms of the target query, that corresponds to the optimized target query. In some implementations, when selecting the particular form of the target query from the different forms of the target query, the query optimizer platform may select the particular form of the target query that minimizes the time periods and/or that minimizes the costs.

In some implementations, the query optimizer platform may train the neural network model in a manner similar to the machine learning model described above in connection with FIG. 1D. In some implementations, rather than training the neural network model, the query optimizer platform may obtain the neural network model from another system or device that trained the neural network model. In this case, the query optimizer platform may provide the other system or device with historical target queries for use in training the neural network model, and may provide the other system or device with updated historical target queries to retrain the neural network model in order to update the neural network model.

Figure 1G:
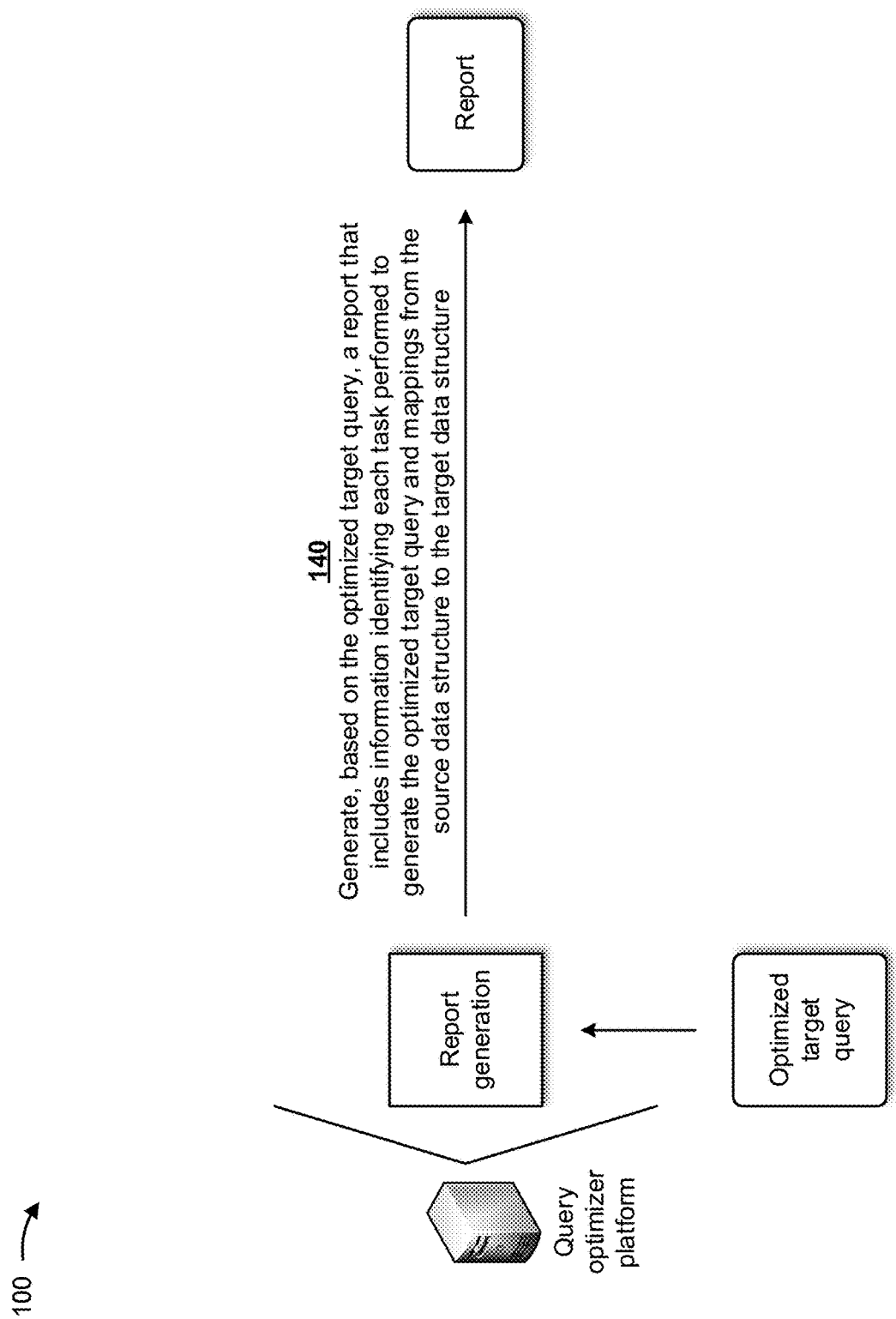

As shown in FIG. 1G, and by reference number 140, the query optimizer platform may generate, based on the optimized target query, a report that includes information identifying each task performed to generate the optimized target query and mappings from the source data structure to the target data structure. For example, the report may include information identifying the statements extracted from the source code, the functions and the keywords identified from the statements, changes applied to queries (e.g., changes to transform source queries to target queries, changes to optimize target queries, and/or the like), a failure of transforming the source query to the target query, a failure of transforming one or more functions or one or more keywords of the source query into one or more functions or one or more keywords of the target query, and/or the like.

As shown in FIG. 1H, and by reference number 145, the query optimizer platform may provide the report to a client device associated with the target data structure. The client device may receive the report, and may provide the report for display to a user of the client device.

As further shown in FIG. 1H, and by reference number 150, the query optimizer platform may provide the optimized target query to the client device and/or the target data structure. In some implementations, the query optimizer platform may provide the optimized target query to the client device, associated with the target data structure, so that the client device may utilize the optimized target query to migrate data from the source data structure to the target data structure. In some implementations, provision of the optimized target query to the target data structure may cause execution of the optimized target query and migration of the data from the source data structure to the target data structure.

As an example of the processes described above in the context of employee data, the query optimizer platform may, as described above in connection with FIG. 1B, analyze source code to extract the statements from the source code, and may, as described above in connection with FIG. 1C, utilize natural language processing on the statements to identify the following functions and keywords associated with the source data structure:

SEL emp.Last_name, emp.First_name, dpt.Dept_no,
    SUBSTR ('dpt.Name',1,5),
    MAVG (acc.salary,3, acc.startdate) AS salary
    FROM Employee AS emp
        INNER JOIN Accounts AS acc ON
           (acc.accid=emp.accid)
        INNER JOIN Department AS dpt ON
           (acc.dptid=dpt.dptid)
    WHERE dpt.Name='DOC'

In such an example, the query optimizer platform may identify SEL, SUBST, and MAVG as functions or keywords.

The query optimizer platform may, as described above in connection with FIG. 1E, process the information associated with the target data structure, with the trained machine learning model, to transform a source query, compatible with the source data structure, to a target query compatible with the target data structure, as follows:

SELECT emp.Last_name, emp.First_name, dpt.Dept_no,
    SUBSTRING ('dpt.Name',1,5),
    AVG (acc.salary,3, acc.startdate) AS salary
    FROM Employee AS emp
        INNER JOIN Accounts AS acc ON
           (acc.accid=emp.accid)
        INNER JOIN Department AS dpt ON
           (acc.dptid=dpt.dptid)
    WHERE dpt.Name='DOC'

In such an example, the trained machine learning model may transform SEL to SELECT, may transform SUBSTR to SUBSTRING, and may transform MAVG to AVG.

For example, the trained machine learning model may determine that SEL is a keyword. Keywords may have subcategories (e.g., default, manipulation, operation, and join). The machine learning model may determine that SEL is in the manipulation subcategory, and may determine that SELECT is an appropriate replacement for SEL. Additionally, the trained machine learning model may determine that SUBSTR is a function. Functions may have subcategories (e.g., mathematical, string, operational, and logical). The machine learning model may determine that SUBSTR is a string function, and may determine that SUBSTRING is the appropriate replacement for SUBSTR. Additionally, the trained machine learning model may determine that MAVG is a mathematical function, and may determine that AVG is the appropriate replacement for MAVG.

The query optimizer platform may, as described above in connection with FIG. 1F, process the target query, with a neural network model, to generate an optimized target query with improved cost and performance relative to cost and performance of the target query, as follows:

SELECT emp.Last_name, emp.First_name, dpt.Dept_no,
    SUBSTRING ('dpt.Name',1,5),
    AVG (acc.salary,3, acc.startdate) AS salary
    FROM Employee AS emp
        INNER JOIN Department AS dpt ON
           (acc.dptid=dpt.dptid AND dpt.Name='DOC')
        INNER JOIN Accounts AS acc ON
           (acc.accid=emp.accid)

In such an example, the neural network model may modify a JOIN function to improve cost and time of execution associated with the target query.

Figure 1I:
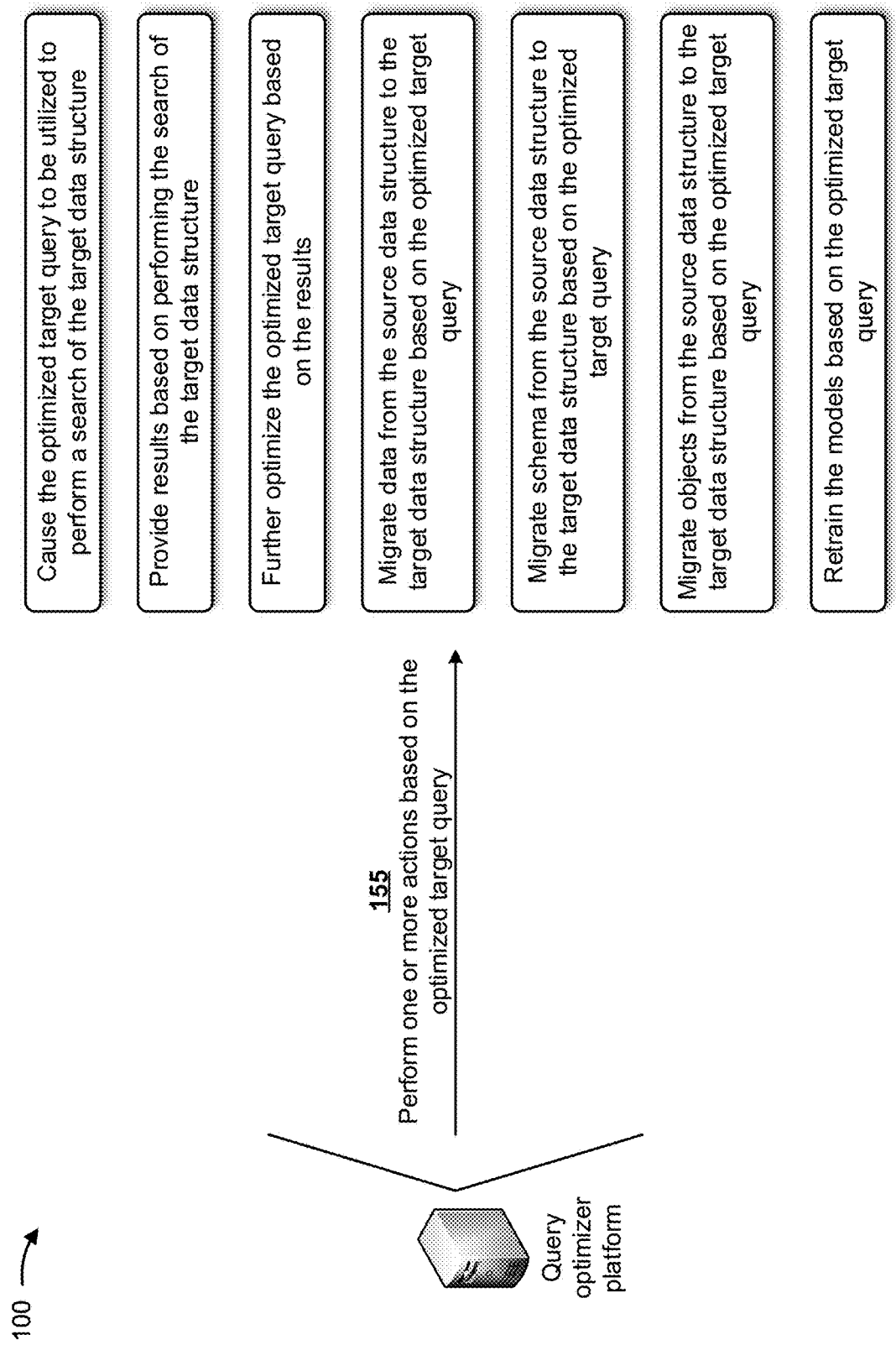

As shown in FIG. 1I, and by reference number 155, the query optimizer platform may perform one or more actions based on the optimized target query. In some implementations, the one or more actions may include the query optimizer platform causing the optimized target query to be utilized to perform a search of the target data structure. In this way, the query optimizer platform may enable an entity (e.g., a system, an application, a user, an enterprise and/or the like) to search and retrieve data from the target data structure (e.g., provided in a cloud computing environment). This enables quicker and cheaper retrieval of the data from the target data structure, and conserves resources (e.g., computing resources, networking resources, and/or the like) that would otherwise be wasted in retrieving the data from the target data structure using current techniques.

In some implementations, the one or more actions may include the query optimizer platform providing results based on performing the search of the target data structure. In this way, the query optimizer platform may enable the entity to obtain search results from the target data structure (e.g., provided in a cloud computing environment) that are similar to results that would be obtained based on performing the search via the source data structure (e.g., a physical environment). In this way, the query optimizer platform may utilize a cloud-based data structure without any loss of accuracy in the results, thereby conserving computing resources that would otherwise be wasted relying on incorrect results, correcting incorrect results, and/or the like.

In some implementations, the one or more actions may include the query optimizer platform further optimizing the optimized target query based on the results. For example, the query optimizer platform may monitor a time period and/or a cost associated with performing the search, and may provide information associated with the time period and/or the cost to the query optimizer platform. The query optimizer platform may utilize the information to retrain the neural network model to further optimize the target query. In this way, the query optimizer platform may further improve performance (e.g., query speed, query cost, and/or the like) of the optimized target query for future use with the target data structure.

In some implementations, the one or more actions may include the query optimizer platform migrating data from the source data structure to the target data structure based on the optimized target query. For example, the query optimizer platform may utilize the optimized target query to migrate data from the source data structure (e.g., a physical environment) to the target data structure (e.g., a cloud-based) environment. In this way, the query optimizer platform may automatically migrate the data in way that is faster and more reliable than manual migration of the data, which may conserve computing resources that would otherwise be wasted in migrating the data from the source data structure using current techniques.

In some implementations, the one or more actions may include the query optimizer platform migrating schema from the source data structure to the target data structure based on the optimized target query. For example, the query optimizer platform may utilize the migrated schema to organize the migrated data in the target data structure in a manner that is compatible with the optimized target query. In this way, the query optimizer platform may automatically migrate the schema in way that is faster and more reliable than manual migration of the schema, which may conserve computing resources that would otherwise be wasted in migrating the schema from the source data structure using current techniques.

In some implementations, the one or more actions may include the query optimizer platform migrating objects from the source data structure to the target data structure based on the optimized target query. For example, the query optimizer platform may utilize the migrated objects to define data in the target data structure in the form of objects that are compatible with the target query. In this way, the query optimizer platform may automatically migrate the objects in way that is faster and more reliable than manual migration of the objects, which may conserve computing resources that would otherwise be wasted in migrating the objects from the source data structure using current techniques.

In some implementations, the one or more actions may include the query optimizer platform retraining the models based on the optimized target query. For example, the query optimizer platform may retrain the machine learning model, the neural network model (e.g., reinforced learning model, cost-based model, time-based model, and/or the like), natural language processing models, and/or the like based on the optimized target query. In this way, the query optimizer platform may improve the accuracy of the models in identifying functions and keywords, transforming source queries to target queries, optimizing target queries, and/or the like, which may improve speed and efficiency of the models and conserve computing resources, networking resources, and/or the like.

In this way, neural network and machine learning models are utilized to generate a query after migrating data from a source data structure to a target data structure. This, in turn, conserves computing resources (e.g., processing resources, memory resources, communication resources, and/or the like), networking resources, and/or the like that would otherwise be wasted incorrectly migrating data from the source data structure to the target data structure based on incorrect mappings, identifying the incorrect mappings, correcting the incorrect mappings, reperforming the migration of the data from the source data structure to the target data structure, and/or like. Furthermore, several different stages of the process for generating the query after migrating data from the source data structure to the target data structure may be automated via models, which may improve speed and efficiency of the process and conserve computing resources, networking resources, and/or the like. Implementations described herein use a rigorous, computerized process to perform tasks or roles that were not previously performed. For example, currently there does not exist a technique that utilizes neural network and machine learning models to generate a query after migrating data from a source data structure to a target data structure.

As indicated above, FIGS. 1A-1I are provided merely as examples. Other examples may differ from what is described with regard to FIGS. 1A-1I.

Figure 2:
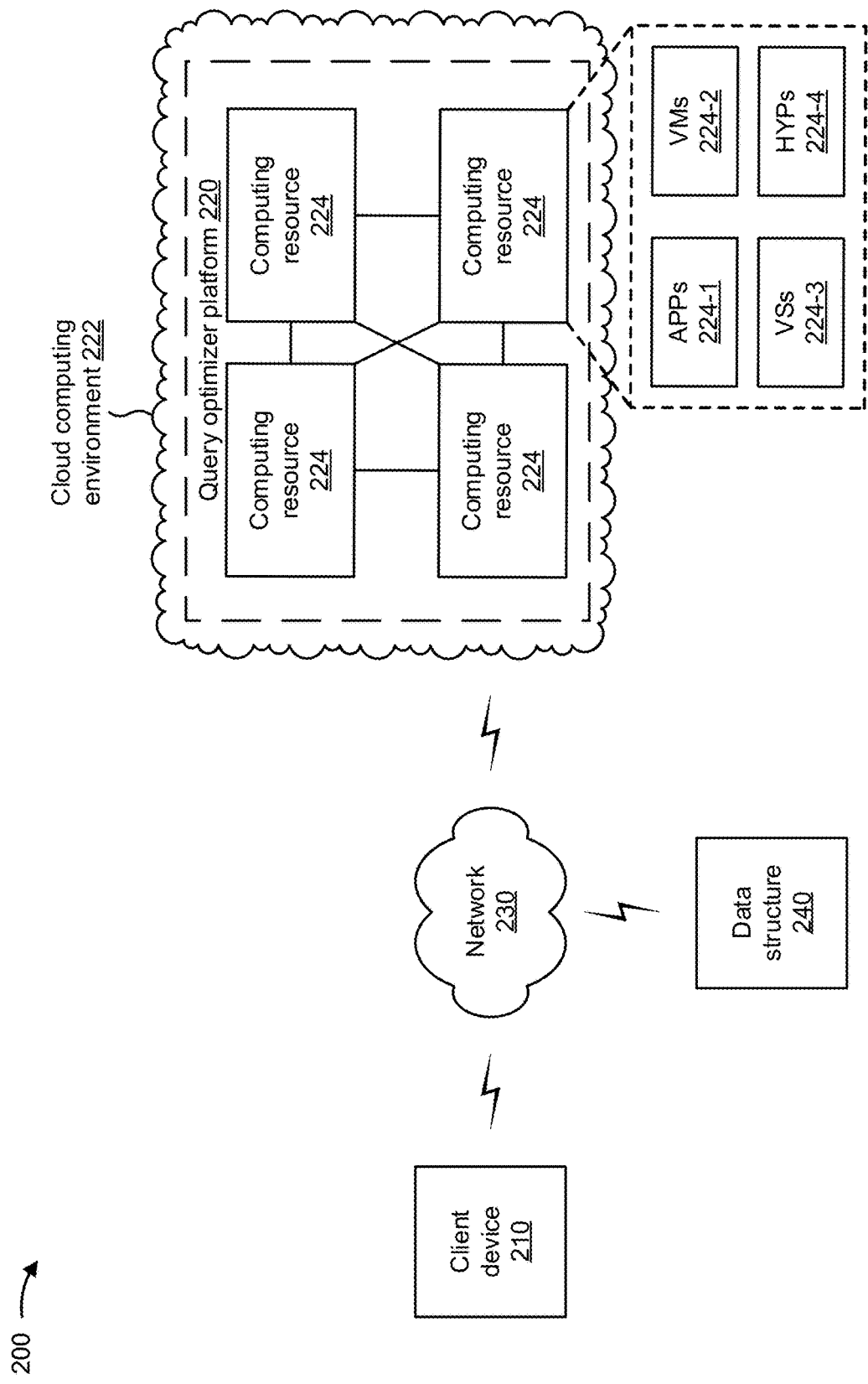
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a query optimizer platform 220, a network 230, and a data structure 240. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, client device 210 may receive information from and/or transmit information to query optimizer platform 220 and/or data structure 240.

Query optimizer platform 220 includes one or more devices that utilize neural network and machine learning models to generate a query after migrating data from a source data structure to a target data structure. In some implementations, query optimizer platform 220 may be designed to be modular such that certain software components may be swapped in or out depending on a particular need. As such, query optimizer platform 220 may be easily and/or quickly reconfigured for different uses. In some implementations, query optimizer platform 220 may receive information from and/or transmit information to one or more client devices 210 and/or data structures 240.

In some implementations, as shown, query optimizer platform 220 may be hosted in a cloud computing environment 222. Notably, while implementations described herein describe query optimizer platform 220 as being hosted in cloud computing environment 222, in some implementations, query optimizer platform 220 may not be cloud-based (i.e., may be implemented outside of a cloud computing environment) or may be partially cloud-based.

Cloud computing environment 222 includes an environment that hosts query optimizer platform 220. Cloud computing environment 222 may provide computation, software, data access, storage, etc., services that do not require end-user knowledge of a physical location and configuration of system(s) and/or device(s) that hosts query optimizer platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host query optimizer platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210 and/or data structure 240. Application 224-1 may eliminate a need to install and execute the software applications on client device 210. For example, application 224-1 may include software associated with query optimizer platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of client device 210 or an operator of query optimizer platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Data structure 240 includes one or more storage devices capable of receiving, generating, storing, processing, and/or providing information, such as information described herein. For example, data structure 240 may include a data warehouse, a database engine, a database, a data repository, a data center, a cloud computing resource, a table, a list, and/or the like. In some implementations, data structure 240 may receive information from and/or transmit information to client device 210 and/or query optimizer platform 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
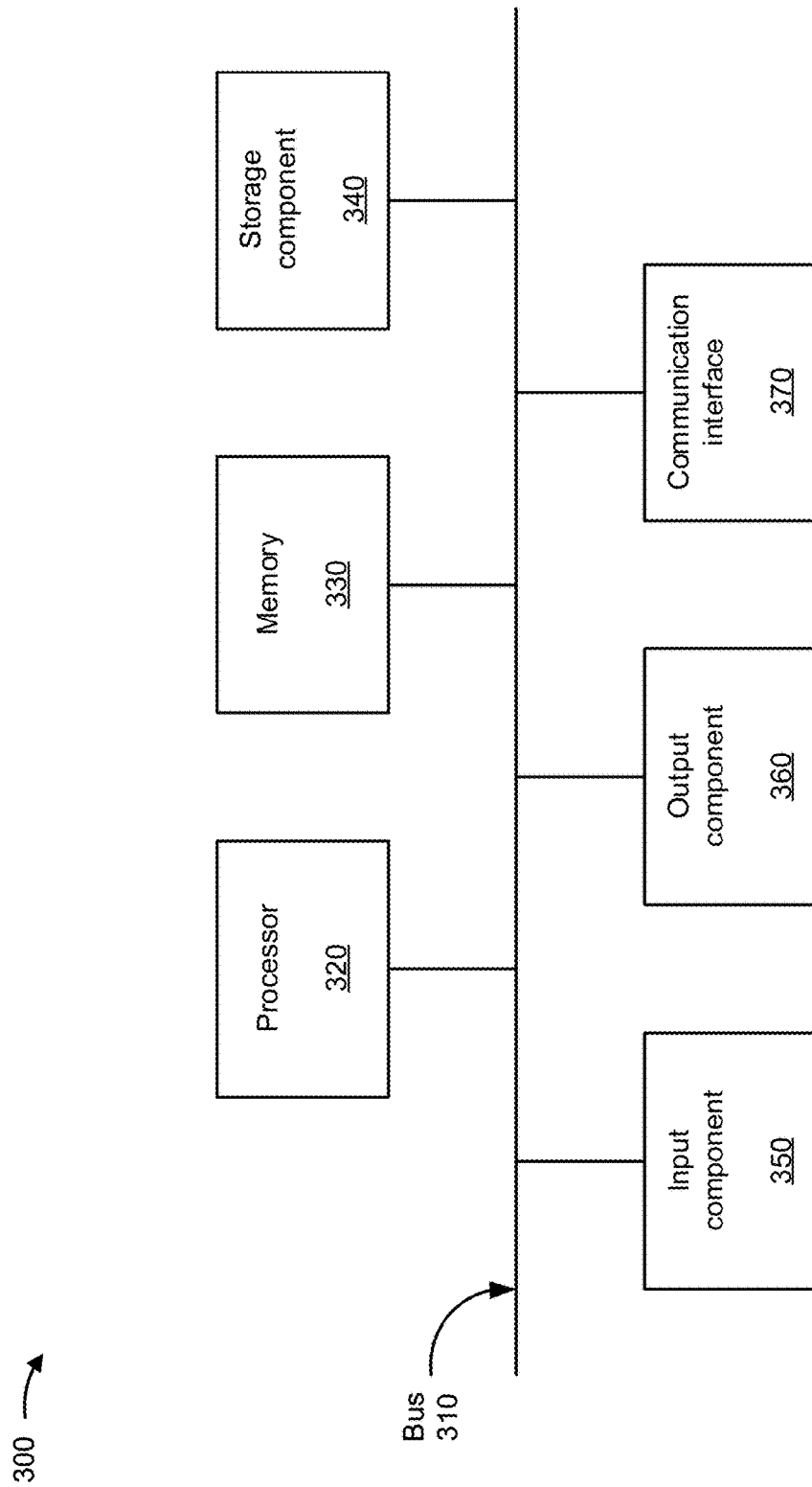
FIG. 3 is a diagram of example components of one or more devices of FIG. 2.

FIG. 3 is a diagram of example components of a device 300. Device 300 may correspond to client device 210, query optimizer platform 220, and/or computing resource 224. In some implementations, client device 210, query optimizer platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for utilizing neural network and machine learning models to generate a query after migrating data from a source data structure to a target data structure. In some implementations, one or more process blocks of FIG. 4 may be performed by a device (e.g., query optimizer platform 220). In some implementations, one or more process blocks of FIG. 4 may be performed by another device or a group of devices separate from or including the device, such as a client device (e.g., client device 210).

As shown in FIG. 4, process 400 may include receiving source code from a source data structure (block 410). For example, the device (e.g., using computing resource 224, processor 320, communication interface 370, and/or the like) may receive source code from a source data structure, as described above.

As further shown in FIG. 4, process 400 may include receiving information associated with a target data structure (block 420). For example, the device (e.g., using computing resource 224, processor 320, communication interface 370, and/or the like) may receive information associated with a target data structure, as described above.

As further shown in FIG. 4, process 400 may include analyzing the source code to extract statements included in the source code (block 430). For example, the device (e.g., using computing resource 224, processor 320, memory 330, and/or the like) may analyze the source code to extract statements included in the source code, as described above.

As further shown in FIG. 4, process 400 may include utilizing natural language processing on the statements to identify functions and keywords associated with the source data structure (block 440). For example, the device (e.g., using computing resource 224, processor 320, storage component 340, and/or the like) may utilize natural language processing on the statements to identify functions and keywords associated with the source data structure, as described above.

As further shown in FIG. 4, process 400 may include training a machine learning model with the functions and the keywords to generate a trained machine learning model (block 450). For example, the device (e.g., using computing resource 224, processor 320, memory 330, storage component 340, and/or the like) may train a machine learning model with the functions and the keywords to generate a trained machine learning model, as described above.

As further shown in FIG. 4, process 400 may include processing the information associated with the target data structure, with the trained machine learning model, to transform a source query to a target query compatible with the target data structure (block 460). For example, the device (e.g., using computing resource 224, processor 320, memory 330, and/or the like) may process the information associated with the target data structure, with the trained machine learning model, to transform a source query to a target query compatible with the target data structure, as described above.

As further shown in FIG. 4, process 400 may include processing the target query, with a neural network model, to generate an optimized target query with improved cost and performance relative to a cost and a performance of the target query (block 470). For example, the device (e.g., using computing resource 224, processor 320, storage component 340, and/or the like) may process the target query, with a neural network model, to generate an optimized target query with improved cost and performance relative to a cost and a performance of the target query, as described above.

As further shown in FIG. 4, process 400 may include causing data from the source data structure to be migrated to the target data structure based on the optimized target query (block 480). For example, the device (e.g., using computing resource 224, processor 320, memory 330, storage component 340, communication interface 370, and/or the like) may cause data from the source data structure to be migrated to the target data structure based on the optimized target query, as described above.

Process 400 may include additional implementations, such as any single implementation or any combination of implementations described below and/or in connection with one or more other processes described elsewhere herein.

In a first implementation, process 400 may include providing the optimized target query to a client device associated with the target data structure, where the client device may utilize the optimized target query to migrate the data from the source data structure to the target data structure.

In a second implementation, alone or in combination with the first implementation, process 400 may include causing schema from the source data structure to be migrated to the target data structure based on the optimized target query, and causing objects from the source data structure to be migrated to the target data structure based on the optimized target query.

In a third implementation, alone or in combination with one or more of the first and second implementations, process 400 may include generating, based on the optimized target query, a report that includes information identifying each task performed to generate the optimized target query and mappings from the source data structure to the target data structure, and providing the report to a client device associated with the target data structure.

In a fourth implementation, alone or in combination with one or more of the first through third implementations, process 400 may include causing the optimized target query to be utilized to perform a search of the target data structure, providing results based on performing the search of the target data structure, and further optimizing the optimized target query based on the results.

In a fifth implementation, alone or in combination with one or more of the first through fourth implementations, process 400 may include retraining the machine learning model and the neural network model based on the optimized target query.

In a sixth implementation, alone or in combination with one or more of the first through fifth implementations, when training the machine learning model with the functions and the keywords to generate the trained machine learning model, process 400 may include utilizing natural language processing to parse the functions and the keywords into source tokens, and classifying each of the source tokens into a segment associated with the target data structure.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for utilizing neural network and machine learning models to generate a query after migrating data from a source data structure to a target data structure. In some implementations, one or more process blocks of FIG. 5 may be performed by a device (e.g., query optimizer platform 220). In some implementations, one or more process blocks of FIG. 5 may be performed by another device or a group of devices separate from or including the device, such as a client device (e.g., client device 210).

As shown in FIG. 5, process 500 may include receiving source code from a source data structure (block 510). For example, the device (e.g., using computing resource 224, processor 320, communication interface 370, and/or the like) may receive source code from a source data structure, as described above.

As further shown in FIG. 5, process 500 may include receiving information associated with a target data structure (block 520). For example, the device (e.g., using computing resource 224, processor 320, communication interface 370, and/or the like) may receive information associated with a target data structure, as described above.

As further shown in FIG. 5, process 500 may include analyze the source code to extract structured query language (SQL) statements included in the source code (block 530). For example, the device (e.g., using computing resource 224, processor 320, memory 330, and/or the like) may analyze the source code to extract structured query language (SQL) statements included in the source code, as described above.

As further shown in FIG. 5, process 500 may include utilizing natural language processing on the SQL statements to identify functions and keywords associated with the source data structure (block 540). For example, the device (e.g., using computing resource 224, processor 320, storage component 340, and/or the like) may utilize natural language processing on the SQL statements to identify functions and keywords associated with the source data structure, as described above.

As further shown in FIG. 5, process 500 may include training a machine learning model with the functions and the keywords to generate a trained machine learning model (block 550). For example, the device (e.g., using computing resource 224, processor 320, memory 330, storage component 340, and/or the like) may train a machine learning model with the functions and the keywords to generate a trained machine learning model, as described above.

As further shown in FIG. 5, process 500 may include processing the information associated with the target data structure, with the trained machine learning model, to transform a source query to a target query compatible with the target data structure (block 560). For example, the device (e.g., using computing resource 224, processor 320, memory 330, and/or the like) may process the information associated with the target data structure, with the trained machine learning model, to transform a source query to a target query compatible with the target data structure, as described above.

As further shown in FIG. 5, process 500 may include processing the target query, with a neural network model, to generate an optimized target query with improved cost and performance relative to a cost and a performance of the target query (block 570). For example, the device (e.g., using computing resource 224, processor 320, storage component 340, and/or the like) may process the target query, with a neural network model, to generate an optimized target query with improved cost and performance relative to a cost and a performance of the target query, as described above.

As further shown in FIG. 5, process 500 may include providing the optimized target query to a client device associated with the target data structure, wherein the client device is able to utilize the optimized target query to migrate data from the source data structure to the target data structure (block 580). For example, the device (e.g., using computing resource 224, processor 320, memory 330, storage component 340, communication interface 370, and/or the like) may provide the optimized target query to a client device associated with the target data structure, as described above. In some implementations, the client device may utilize the optimized target query to migrate data from the source data structure to the target data structure.

Process 500 may include additional implementations, such as any single implementation or any combination of implementations described below and/or in connection with one or more other processes described elsewhere herein.

In a first implementation, the neural network model may include a reinforcement learning model.

In a second implementation, alone or in combination with the first implementation, the neural network model may include a cost-based model and a time-based model.

In a third implementation, alone or in combination with one or more of the first and second implementations, when processing the target query, with the neural network model, to generate the optimized target query, process 500 may include generating a parsed representation of the target query, providing the parsed representation of the target query as input to the neural network model, and utilizing the neural network model and the parsed representation of the target query to select the optimized target query from a plurality of potential target queries.

In a fourth implementation, alone or in combination with one or more of the first through third implementations, when processing the target query, with the neural network model, to generate the optimized target query, process 500 may include utilizing the neural network model to determine times associated with executions of different forms of the target query; utilizing the neural network model to determine costs associated with the executions of the different forms of the target query; and selecting a particular form of the target query from the different forms of the target query based on the times and the costs, wherein the particular form of the target query may correspond to the optimized target query.

In a fifth implementation, alone or in combination with one or more of the first through fourth implementations, when selecting the particular form of the target query from the different forms of the target query, process 500 may include selecting the particular form of the target query that minimizes the times and the costs.

In a sixth implementation, alone or in combination with one or more of the first through fifth implementations, the source data structure may be associated with hardware, and the target data structure may be associated with a cloud computing environment.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for utilizing neural network and machine learning models to generate a query after migrating data from a source data structure to a target data structure. In some implementations, one or more process blocks of FIG. 6 may be performed by a device (e.g., query optimizer platform 220). In some implementations, one or more process blocks of FIG. 6 may be performed by another device or a group of devices separate from or including the device, such as a client device (e.g., client device 210).

As shown in FIG. 6, process 600 may include receiving source code from a source data structure (block 610). For example, the device (e.g., using computing resource 224, processor 320, communication interface 370, and/or the like) may receive source code from a source data structure, as described above.

As further shown in FIG. 6, process 600 may include receiving information associated with a target data structure (block 620). For example, the device (e.g., using computing resource 224, processor 320, communication interface 370, and/or the like) may receive information associated with a target data structure, as described above.

As further shown in FIG. 6, process 600 may include processing the information associated with the target data structure, with a machine learning model, to transform a source query, compatible with the source data structure, to a target query compatible with the target data structure, wherein the source code is analyzed to extract statements included in the source code, wherein natural language processing is utilized on the statements to identify functions and keywords, and wherein the machine learning model is trained based on the functions and the keywords (block 630). For example, the device (e.g., using computing resource 224, processor 320, memory 330, storage component 340, and/or the like) may process the information associated with the target data structure, with a machine learning model, to transform a source query, compatible with the source data structure, to a target query compatible with the target data structure, as described above. In some implementations, the source code may be analyzed to extract statements included in the source code, natural language processing may be utilized on the statements to identify functions and keywords, and the machine learning model may be trained based on the functions and the keywords.

As further shown in FIG. 6, process 600 may include processing the target query, with a neural network model, to generate an optimized target query with improved cost and performance relative to a cost and a performance of the target query (block 640). For example, the device (e.g., using computing resource 224, processor 320, memory 330, and/or the like) may process the target query, with a neural network model, to generate an optimized target query with improved cost and performance relative to a cost and a performance of the target query, as described above.

As further shown in FIG. 6, process 600 may include causing data from the source data structure to be migrated to the target data structure based on the optimized target query (block 650). For example, the device (e.g., using computing resource 224, processor 320, memory 330, storage component 340, communication interface 370, and/or the like) may cause data from the source data structure to be migrated to the target data structure based on the optimized target query, as described above.

Process 600 may include additional implementations, such as any single implementation or any combination of implementations described below and/or in connection with one or more other processes described elsewhere herein.

In a first implementation, process 600 may include causing schema from the source data structure to be migrated to the target data structure based on the optimized target query, and causing objects from the source data structure to be migrated to the target data structure based on the optimized target query.

In a second implementation, alone or in combination with the first implementation, process 600 may include generating, based on the optimized target query, a report that includes information identifying each task performed to generate the optimized target query and mappings from the source data structure to the target data structure; and providing the report to a client device associated with the target data structure.

In a third implementation, alone or in combination with one or more of the first and second implementations, process 600 may include causing the optimized target query to be utilized to perform a search of the target data structure, providing results based on performing the search of the target data structure, and further optimizing the optimized target query based on the results.

In a fourth implementation, alone or in combination with one or more of the first through third implementations, when training the machine learning model with the functions and the keywords, process 600 may include utilizing natural language processing to parse the functions and the keywords into source tokens, and classifying each of the source tokens into a segment associated with the target data structure.

In a fifth implementation, alone or in combination with one or more of the first through fourth implementations, when processing the target query, with the neural network model, to generate the optimized target query, process 600 may include utilizing the neural network model to determine times associated with executions of different forms of the target query; utilizing the neural network model to determine costs associated with the executions of the different forms of the target query; and selecting a particular form of the target query from the different forms of the target query based on the times and the costs, the particular form of the target query corresponds to the optimized target query.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
 receiving, by a device, source code from a source data structure;
 receiving, by the device, information associated with a target data structure;
 analyzing, by the device, the source code to extract statements included in the source code;
 utilizing, by the device, natural language processing on the statements to identify functions and keywords associated with the source data structure;
 training, by the device, a machine learning model with the functions and the keywords to generate a trained machine learning model;
 migrating, by the device, data from the source data structure to the target data structure;
 processing, by the device, the information associated with the target data structure, with the trained machine learning model, to transform a source query to a target query compatible with the target data structure;
 processing, by the device, the target query, with a neural network model, to generate an optimized target query with improved cost and performance relative to a cost and a performance of the target query; and
 utilizing, by the device, the optimized target query to perform a search of the target data structure.

2. The method of claim 1, further comprising:
 providing the optimized target query to a client device associated with the target data structure,
 wherein the client device is able to utilize the optimized target query to migrate the data from the source data structure to the target data structure.

3. The method of claim 1, further comprising:
 causing schema from the source data structure to be migrated to the target data structure based on the optimized target query; and
 causing objects from the source data structure to be migrated to the target data structure based on the optimized target query.

4. The method of claim 1, further comprising:
 generating, based on the optimized target query, a report that includes information identifying each task performed to generate the optimized target query and mappings from the source data structure to the target data structure; and
 providing the report to a client device associated with the target data structure.

5. The method of claim 1, further comprising:
 providing results based on performing the search of the target data structure; and
 further optimizing the optimized target query based on the results.

6. The method of claim 1, further comprising:
 retraining the machine learning model and the neural network model based on the optimized target query.

7. The method of claim 1, wherein training the machine learning model with the functions and the keywords to generate the trained machine learning model comprises:
   utilizing natural language processing to parse the functions and the keywords into source tokens; and
   classifying each of the source tokens into a segment associated with the target data structure.

8. A device, comprising:
   one or more memories; and
   one or more processors, communicatively coupled to the one or more memories, configured to:
      receive source code from a source data structure;
      receive information associated with a target data structure;
      analyze the source code to extract structured query language (SQL) statements included in the source code;
      utilize natural language processing on the SQL statements to identify functions and keywords associated with the source data structure;
      train a machine learning model with the functions and the keywords to generate a trained machine learning model;
      migrate data from the source data structure to the target data structure;
      process the information associated with the target data structure, with the trained machine learning model, to transform a source query to a target query compatible with the target data structure;
      process the target query, with a neural network model, to generate an optimized target query with improved cost and performance relative to a cost and a performance of the target query; and
      utilize the optimized target query to perform a search of the target data structure.

9. The device of claim 8, wherein the neural network model includes a reinforcement learning model.

10. The device of claim 8, wherein the neural network model includes:
    a cost-based model, and
    a time-based model.

11. The device of claim 8, wherein the one or more processors, to process the target query, with the neural network model, to generate the optimized target query, are configured to:
    generate a parsed representation of the target query;
    provide the parsed representation of the target query as input to the neural network model; and
    utilize the neural network model and the parsed representation of the target query to select the optimized target query from a plurality of potential target queries.

12. The device of claim 8, wherein the one or more processors, to process the target query, with the neural network model, to generate the optimized target query, are configured to:
    utilize the neural network model to determine times associated with executions of different forms of the target query;
    utilize the neural network model to determine costs associated with the executions of the different forms of the target query; and
    select a particular form of the target query from the different forms of the target query based on the times and the costs,
       wherein the particular form of the target query corresponds to the optimized target query.

13. The device of claim 12, wherein the one or more processors, to select the particular form of the target query from the different forms of the target query, are configured to:
    select the particular form of the target query that minimizes the times and the costs.

14. The device of claim 8, wherein:
    the source data structure is associated with hardware, and
    the target data structure is associated with a cloud computing environment.

15. A non-transitory computer-readable medium storing instructions, the instructions comprising:
    one or more instructions that, when executed by one or more processors, cause the one or more processors to:
       receive source code from a source data structure;
       receive information associated with a target data structure;
       migrate data from the source data structure to the target data structure;
       process the information associated with the target data structure, with a machine learning model, to transform a source query, compatible with the source data structure, to a target query compatible with the target data structure,
          wherein the source code is analyzed to extract statements included in the source code,
          wherein natural language processing is utilized on the statements to identify functions and keywords, and
          wherein the machine learning model is trained based on the functions and the keywords;
       process the target query, with a neural network model, to generate an optimized target query with improved cost and performance relative to a cost and a performance of the target query; and
       utilize the optimized target query to perform a search of the target data structure.

16. The non-transitory computer-readable medium of claim 15, wherein the instructions further comprise:
    one or more instructions that, when executed by the one or more processors, cause the one or more processors to:
       cause schema from the source data structure to be migrated to the target data structure based on the optimized target query; and
       cause objects from the source data structure to be migrated to the target data structure based on the optimized target query.

17. The non-transitory computer-readable medium of claim 15, wherein the instructions further comprise:
    one or more instructions that, when executed by the one or more processors, cause the one or more processors to:
       generate, based on the optimized target query, a report that includes information identifying each task performed to generate the optimized target query and mappings from the source data structure to the target data structure; and
       provide the report to a client device associated with the target data structure.

18. The non-transitory computer-readable medium of claim 15, wherein the instructions further comprise:
    one or more instructions that, when executed by the one or more processors, cause the one or more processors to:
       provide results based on performing the search of the target data structure; and further optimize the optimized target query based on the results.

19. The non-transitory computer-readable medium of claim 15, wherein the one or more instructions, that cause the one or more processors to train the machine learning model with the functions and the keywords, cause the one or more processors to:
   utilize natural language processing to parse the functions and the keywords into source tokens; and
   classify each of the source tokens into a segment associated with the target data structure.

20. The non-transitory computer-readable medium of claim 15, wherein the one or more instructions, that cause the one or more processors to process the target query, with the neural network model, to generate the optimized target query, cause the one or more processors to:
   utilize the neural network model to determine times associated with executions of different forms of the target query;
   utilize the neural network model to determine costs associated with the executions of the different forms of the target query; and
   select a particular form of the target query from the different forms of the target query based on the times and the costs,
      wherein the particular form of the target query corresponds to the optimized target query.

* * * * *